United States Patent [19]

Bregman et al.

[11] Patent Number: 4,645,180
[45] Date of Patent: Feb. 24, 1987

[54] WIRE FORM TYPE INSERT RETAINER FOR A WAFER STYLE BUTTERFLY VALVE

[75] Inventors: Arie P. Bregman, Sterling Junction; Ronald J. Collette, Spencer; Edward J. Currier, Woburn, all of Mass.

[73] Assignee: Jamesbury Corporation, Worcester, Mass.

[21] Appl. No.: 792,555

[22] Filed: Oct. 29, 1985

Related U.S. Application Data

[63] Continuation-in-part of Ser. No. 621,066, Jun. 15, 1984, Pat. No. 4,575,048.

[51] Int. Cl.⁴ .................. F16K 1/22; F16K 43/00
[52] U.S. Cl. ..................... 251/360; 251/306; 137/315; 403/326
[58] Field of Search ............ 251/360, 306; 137/315; 403/326

[56] References Cited

U.S. PATENT DOCUMENTS

| 1,407,602 | 2/1922 | Thomson | 277/161 |
|---|---|---|---|
| 1,413,521 | 4/1922 | Davis | 277/161 |
| 1,675,109 | 5/1927 | Kelly | 277/161 |
| 1,708,256 | 4/1929 | Burnham | 277/161 |
| 1,773,250 | 2/1929 | Amberg | 277/161 |
| 1,834,067 | 12/1931 | Marien | 277/161 |
| 1,922,369 | 8/1933 | Johnson | 277/161 |
| 2,044,845 | 6/1936 | Guerriero | 277/161 |
| 2,155,031 | 11/1938 | Amberg | 277/161 |
| 2,170,970 | 8/1939 | Johnston | 277/161 |
| 2,631,577 | 3/1953 | Carter | 251/363 |
| 2,736,529 | 2/1956 | Songer | 251/360 |
| 2,907,548 | 10/1959 | Maas et al. | 251/85 |
| 3,189,319 | 6/1965 | Bredtschneider | 251/328 |
| 3,586,290 | 6/1971 | Null | 251/306 |
| 3,656,714 | 4/1972 | Peterson | 251/151 |
| 3,937,441 | 2/1976 | Bauman | 137/527 |
| 4,101,112 | 7/1978 | Conners et al. | 251/148 |
| 4,272,054 | 6/1981 | Zinnai | 251/173 |
| 4,293,116 | 10/1981 | Hinrichs | 251/173 |

FOREIGN PATENT DOCUMENTS 831976 4/1960 United Kingdom ........... 251/307

Primary Examiner—A. Michael Chambers
Attorney, Agent, or Firm—Oblon, Fisher, Spivak, McClelland & Maier

[57] ABSTRACT

A wafer style butterfly valve has a valve body including a through opening with a cylindrical wall coaxially surrounding an end portion of the fluid passage. The insert is retained within the valve body by at least one wire form held in an annular channel defined by facing annular grooves in the valve body wall and the insert peripheral wall. The wire form includes a member projecting therefrom for engaging a surface of the annular groove in the valve body wall or the annular groove in the insert peripheral wall. A tapered wall at one end of the insert provides for expansion of the wire form during insertion of the insert into the valve body.

15 Claims, 4 Drawing Figures

WIRE FORM TYPE INSERT RETAINER FOR A WAFER STYLE BUTTERFLY VALVE

BACKGROUND OF THE INVENTION

1. Field of the Invention

The present invention is a continuation-in-part of U.S. application Ser. No. 621,066 filed June 15, 1984, now U.S. Pat. No. 4,575,048, issued Mar. 11, 1986 and relates to a wafer style butterfly valve, more particularly a wire form type arrangement for retaining the insert within the valve body by utilizing a wire form having a projection extending therefrom.

2. Brief Description of the Prior Art

Butterfly valves are well known in the art. Also known are insert type butterfly valves. Examples of such an Insert type butterfly valves are Jamesbury Series 815W and 830W Wafer Sphere valves. It is common to position a valve insert, such as a valve seat for a butterfly valve, in a recess at the axial end of the through opening in the valve body which defines the fluid flow passage. As a result, this insert can be reached by detaching the adjacent conduit at the connecting flange.

When the adjacent conduit is connected to the valve body at their adjoining flanges, the insert is held within the valve body and pressed between the valve body and the adjacent conduit, and so is securely held in place. However, some means are necessary for retaining the insert in place within the valve body before the attachment of the adjacent conduit. It has been known to drill matching bolt holes through the insert and into a shoulder of the valve body, and then to bolt the insert to the valve body via these matching holes. However, this technique has the shortcomings that the drilling of matching holes is time consuming and the resulting bolt heads extending from the insert may mar the surface of a gasket at the axial end of the insert. Moreover, the insertion and removal of the insert from the valve body requires bolting and unbolting, which is also time consuming.

SUMMARY OF THE INVENTION

It is an object of the present invention to provide an arrangement for retaining the insert of a wafer style butterfly valve which does not require bolting of the insert to the valve body.

It is a further object of the present invention to provide a wire form type arrangement for retaining the insert of a wafer style butterfly valve which is quickly and easily assembled and disassembled.

It is a further object of the present invention to provide an arrangement for retaining the insert in a wafer style butterfly valve which is simple to use and is formed of a minimum number of parts.

According to the present invention, the insert is retained within the valve body by one or more resilient wire forms which are held in annular channels defined by facing annular grooves of the insert and a wall of the valve body. The wire forms are circular in section and the annular groove of the insert is shaped such that the wire forms are held in a resiliently stressed state within the annular recess of the insert. The portions of the wire forms which extend into the recess of the wall of the valve body engages with this recess in the valve body and prevents the insert from falling out of the valve body. At a predetermined position on each wire form a projection extends to engage with the surface of annular groove in the wall of the valve body so as to secure the wire form in place.

According to a further feature of the invention, the peripheral surface of the insert has tapered axial end. This tapered end is inserted first into the valve body when introducing the insert thereinto. The tapered surface contacts midportions of the straight sections of the wire forms and resiliently expands the wire forms. When more than about half of the section of each wire form extends over the groove of the insert, the wire form will snap into this groove.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
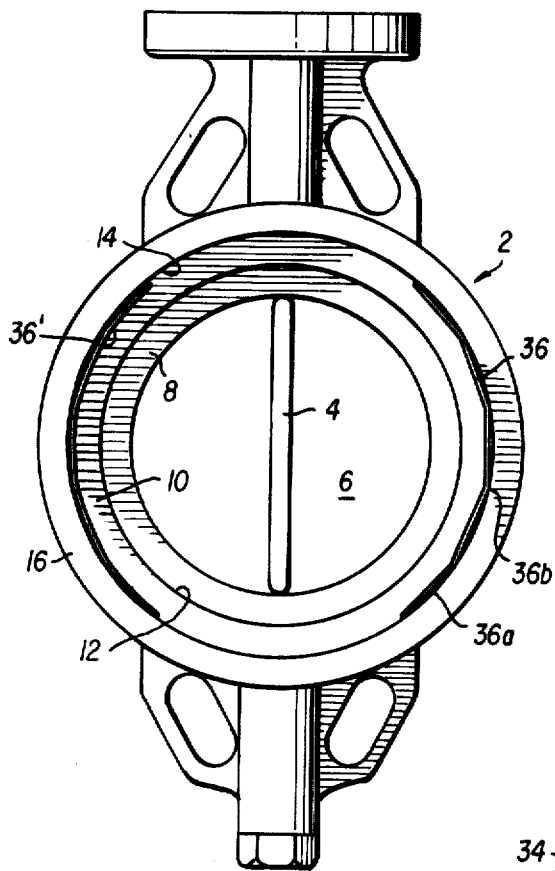
FIG. 1 is a front view of a valve body, including the wire forms but excluding the insert, as seen along the fluid flow direction.

The preferred embodiment will now be described with reference to the attached figures, in which the same reference numeral is used to designate the same element throughout the several views.

FIG. 1 illustrates a wafer style butterfly valve body as seen along the fluid flow directional axis. The body 2 is preferably circular but could instead be some other annular form. The butterfly valve 4 is shown schematically in an open state. The valve body, the valve and the mechanism for opening and closing the valve are conventional except insofar as specifically described herein.

The valve 4 is mounted within a through opening 6 within the valve body which defines a fluid flow passage. At one end of the through opening are annular shoulders 8 and 10 which are separated by a cylindrical step 12. Surrounding the radially outermost shoulder 10 is a cylindrical wall 14 which terminates at the axial end surface 16 of the valve body.

The insert 20 is formed from a toroidal member having a generally rectangular section. The radially outer periphery of the insert is shaped and sized so as to closely fit into the recess of the valve body defined by the shoulder 10 and the wall 14 of the through opening in the valve body. In the case of the preferred embodiment, both the wall 14 of the valve body and the outer peripheral wall 22 of the insert are U-shaped. However, they could instead be hexagonal or of some other shape. A valve seat 24, which is preferably formed of an elastomeric material but may also be metal or a composite of the two, is fitted in an annular recess 26 of the insert 20 and is clamped between this recess and the shoulders 8 and 10 when the insert is fully introduced into the valve body, as seen in FIG. 4.

Figure 2:
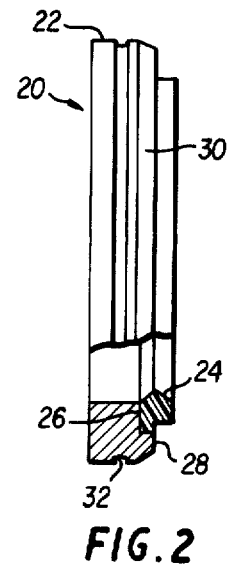
FIG. 2 is a side view, partially in section, of the insert.
Figure 3:
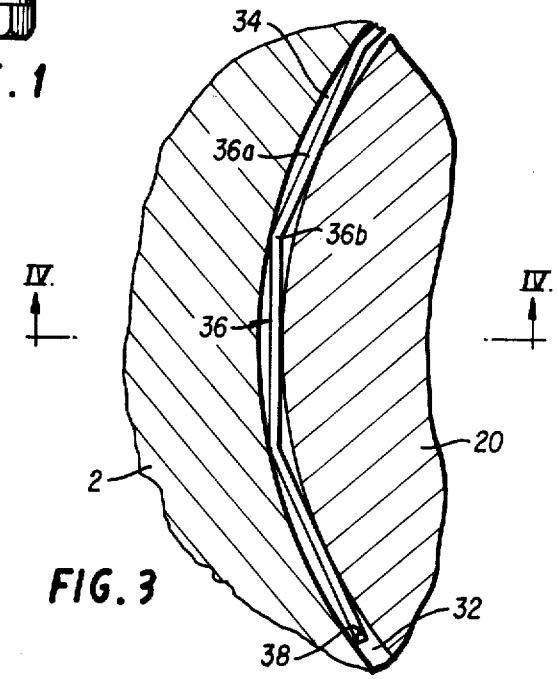
FIG. 3 is an enlarged sectional view of a portion of the insert and valve body, showing the wire form positioned within the annular channel defined by the cooperating annular grooves of the insert and valve body.
Figure 4:
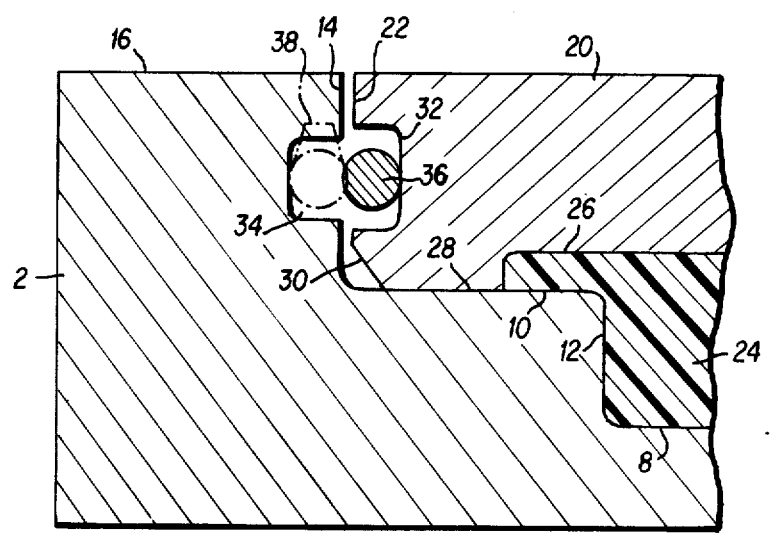
FIG. 4 is an enlarged sectional view taken along line IV—IV of FIG. 3 and which also demonstrates the manner in which the wire form is secured in place.

As best seen in FIGS. 2 and 4, the end of the peripheral surface 22 closest to the axial end surface 28 of the insert 20 includes an annular taper 30. The purpose of the taper will be described below.

An annular groove 32 is formed in a mid-portion of the peripheral surface 22 of the insert. The annular groove 32 has straight edges with rounded corners—not as deep as groove 34 as shown in FIG. 4. The annular groove 34 is formed in the wall 14 of the valve body and is positioned such that it faces the annular groove 32, and forms an annular channel with groove 32, when the insert 20 is fully introduced into the valve body with the surfaces 10 and 28 in abutment, as seen in FIG. 4.

One or more resilient wire forms 36 are positionable in the annular channel. The wire forms may encompass a significant portion of the circumference so as to prevent the insert from falling out. The resilient wire forms are preferably formed from generally circular section wire stock made of a resilient material, such as spring steel. The wire forms 36 are preferably preformed into a shape approximating a curve by providing the otherwise straight sections 36a with sharp bends 36b. A wire form which has been so preformed but which has not yet been stressed by insertion into the annular channel is shown as 36 on the right side of FIG. 1. Preferably, one wire form 36 is employed and is of such an arcuate length as to occupy slightly less than 50% of the annular groove 32. If more than one wire form is employed, the wire forms shall be of such a length and number that they together fill a predetermined portion of the arcuate length of the annular channel.

The insert of the present invention is introduced into, and retained within, the valve body in the following manner. One or more wire forms 36 of an arcuate configuration shown on the right side of FIG. 1 are introduced into the annular groove 34 of the valve body. An insert 20 having a seat 24 mounted thereon is then introduced into the through hole 6 of the valve body with the annular taper 30 being introduced first. As the insert is being introduced into the through opening 6, midportions of the straight sections 36a of the wire forms will engage the tapered surface 30 of the insert. Further introduction of the insert into the through opening 6 will cause the wire forms to resiliently expand in a radially outward direction into the groove 34 by a camming effect of the tapered surface 30 until they are substantially fully inserted into the groove 34 and rest on the cylindrical portion of the peripheral surface 22. The position of the wire form 36 within the groove 34 at this time is shown in FIG. 4. Of course, each wire form is prevented from moving in the axial direction at this time by the axial walls of the groove 34 and groove 32.

Once the wire form has been expanded as the insert is further introduced into the through opening 6, the groove 32 will approach the position of the wire form 36. When more than half the section of a wire form 36 is over the groove 32, the resilience of the wire form 36 will create a camming action and the wire form 36 will tend to resiliently contact-snap into the groove 32. Accordingly, a self-locking action is provided for the insert 20 by the camming effect due to the engagement between the sections of the groove 32 and the wire form 36. Wire form 36' shown at the left in FIG. 1 illustrates the final shape of the wire form after having been stressed by introduction into the groove 32 of the insert 20.

The above structure provides several advantages over the prior art. First, the expansion of the wire forms 36 during the introduction of the insert 20 into the through opening 6 is provided by a tapered surface 30 of the insert itself. Accordingly, a separate mandrel for expanding the wire form 36 is unnecessary. Moreover, the wire form and cooperating annular groove 32 provide a self-locking camming effect for the insert 20, as is described above, so that insertion of the insert is simplified. The assembly and construction of the valve is simplified since a minimal number of parts is required and wire form 36 provides the function of a locking element. The shape of the wire form 36, in which there are alternating straight sections 36a and bends 36b, assures that there is minimal surface area contact between the wire form and the tapered surface 30, thereby minimizing the frictional resistance of the wire form to sliding on the tapered surface 30 during insert introduction. Finally, the bends 36b do not contact the radially inner edge of the groove 32 in the insert 20, and so extend further into the groove 34, thereby further assuring the locking of the insert within the valve body. Also the wire can be made of any corrosion resistant material if necessary.

Each wire form 36 includes a projection 38, represented in dotted lines in FIG. 4 to demonstrate the manner in which it functions, extending from at least one portion thereof for engaging the surface of annular groove 34 so as to secure the wire form 36 in place. It is to be understood that such projection 38 could be located at any position along the length of wire form 36 and could project from wire form 36 in any direction so as to engage a corresponding surface portion of annular groove 34 or, if desired, a surface portion of groove 32.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A wafer style butterfly valve comprising:
 a valve body having a through opening forming a fluid flow passage and having a wall coaxially surrounding an end portion of said fluid flow passage;
 a first annular groove in a surface of said wall;
 an insert having a peripheral surface shaped and sized such that said peripheral surface closely faces said wall surface when said insert is positioned within said through opening, said insert including a second annular groove being positioned in facing opposition to said first groove when said insert is positioned within said through opening, wherein said first and second grooves define an annular channel;
 at least one wire form having an arcuate section defined by a plurality of interconnected straight sections in an undeformed state wherein said wire form includes first and second portions disposed in said first and second grooves, respectively, when said insert is positioned within said through opening so as to retain said insert within said through opening, further comprising engaging means for securing said wire form in place, said engaging means comprising a member projecting outwardly from the surface of said wire form and engaging a surface of one of said first and second annular grooves.

2. The wafer style butterfly valve of claim 1 wherein said peripheral surface is tapered in a direction parallel to an axis of said second groove, such that said tapered peripheral surface stresses and expands said at least one wire form as said insert is introduced into said through opening.

3. The wafer style butterfly valve of claim 2 including a valve seat mounted on said insert.

4. The wafer style butterfly valve of claim 2 wherein said wire form is formed of a single piece of resilient round stock.

5. The wafer style butterfly valve of claim 2 wherein said wall and insert peripheral surface are cylindrical.

6. The wafer style butterfly valve of claim 2 wherein said valve body includes an annular shoulder adjacent said wall, said shoulder being positioned such that said insert abuts said shoulder when positioned in an inserted position in said through opening with said first and second annular grooves in facing opposition.

7. The wafer style butterfly valve of claim 2 wherein said second annular groove is located on a portion of said peripheral surface not including said tapered portion.

8. The wafer style butterfly valve of claim 2 wherein said tapered peripheral surface engages midportions of said straight sections of said wire form and resiliently stresses said wire form when said insert is introduced into said recess.

9. The wafer style butterfly valve of claim 1 including a valve seat mounted on said insert.

10. The wafer style butterfly valve of claim 1 wherein said wire form is formed of a single piece of resilient round stock.

11. The wafer style butterfly valve of claim 5 wherein said wire form is preformed in an unstressed state with straight sections jointed at sharply angled bent portions so as to form a curved wire form.

12. The wafer style butterfly valve of claim 1 wherein said wall and insert peripheral surface are cylindrical.

13. The wafer style butterfly valve of claim 1 wherein said valve body includes an annular shoulder adjacent said wall, said shoulder being positioned such that said insert abuts said shoulder when positioned in an inserted position in said through opening with said first and second annular grooves in facing opposition.

14. The wafer style butterfly valve of claim 13 wherein said insert includes a tapered peripheral surface and an axial end surface intersecting said tapered peripheral surface, said axial end surface abutting said shoulder when said insert is in said inserted position.

15. The wafer style butterfly valve of claim 1 wherein said member projecting from said wire form further comprises a member projecting from at least one end portion of said wire form.

* * * * *

UNITED STATES PATENT AND TRADEMARK OFFICE
CERTIFICATE OF CORRECTION

PATENT NO. : 4,645,180
DATED : February 24, 1987
INVENTOR(S) : Arie P. Bregman, Ronald J. Collette, Edward J. Currier It is certified that error appears in the above—identified patent and that said Letters Patent is hereby corrected as shown below:

IN THE CLAIMS

Claim 11, line 1, change "5" to --10--.

Signed and Sealed this

Twenty-first Day of June, 1988

Attest:

DONALD J. QUIGG

Attesting Officer　　　　Commissioner of Patents and Trademarks